United States Patent [19]
Daum et al.

[11] 3,904,643
[45] Sept. 9, 1975

[54] BENZIMIDAZOL-2-YL-CARBAMIC ACID KETONOXIME ESTERS

[75] Inventors: Werner Daum, Krefeld-Bockum; Paul-Ernst Frohberger, Leverkusen; Brigitte Hamburger, Cologne, all of Germany

[73] Assignee: Bayer Aktiengesellschaft, Leverkusen, Germany

[22] Filed: May 24, 1973

[21] Appl. No.: 363,672

[30] Foreign Application Priority Data
June 8, 1972  Germany............................ 2227920

[52] U.S. Cl............................. 260/309.2; 424/273
[51] Int. Cl.²........................................ C07D 235/32
[58] Field of Search................................. 260/309.2

[56] References Cited
UNITED STATES PATENTS

| | | | |
|---|---|---|---|
| 3,010,968 | 11/1961 | Loux................................ | 260/309.2 |
| 3,541,213 | 11/1970 | Klopping......................... | 260/309.2 |
| 3,631,176 | 12/1971 | Klopping......................... | 260/309.2 |
| 3,636,005 | 1/1972 | Klopping......................... | 260/309.2 |
| 3,641,048 | 2/1972 | Dittmar........................... | 260/309.2 |
| 3,673,210 | 6/1972 | Daum et al. .................... | 260/309.2 |

*Primary Examiner*—Natalie Trousof
*Attorney, Agent, or Firm*—Burgess, Dinklage & Sprung

[57] ABSTRACT

Benzimidazol-2-yl-carbamic acid ketonoxime esters of the formula

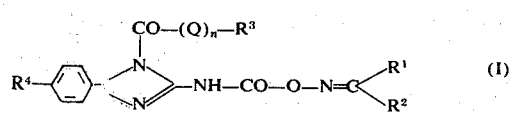

in which
$R^1$ and $R^2$ each independently is alkyl or alkenyl of up to 5 carbon atoms or phenyl, or $R^1$ and $R^2$ together are alkylene of 4 to 10 carbon atoms,
$R^3$ is alkyl or alkenyl of up to 5 carbon atoms, phenyl, halophenyl, chloro-lower alkyl or cyanolower alkyl,
$R^4$ is hydrogen or lower alkyl,
Q is -O-, -NH- or

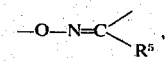

$R^5$ is alkyl or alkenyl with up to 5 carbon atoms or phenyl, and
$n$ is 0 or 1,
which possess fungicidal, microbicidal and algicidal properties.

8 Claims, No Drawings

BENZIMIDAZOL-2-YL-CARBAMIC ACID KETONOXIME ESTERS

The present invention relates to and has for its objects the provision of particular new benzimidazol-2-yl-carbamic acid ketonoxime esters, i.e. 1-acyl-, carboalkoxy- or -carbonamido-benzimidazol-2-yl-carbamic acid ketonoxime esters, which possess fungicidal, microbicidal and algicidal properties, active compositions in the form of mixtures of such compounds with solid and liquid dispersible carrier vehicles, and methods for producing such compounds and for using such compounds in a new way especially for combating pests, e.g. fungi, microbes and algae, especially fungi and microbes, with other and further objects becoming apparent from a study of the within specification and accompanying examples.

As has already been known for a long time, zinc ethylene-1,2-bis-dithiocarbamate (Compound A) and N-trichloromethylthiotetrahydrophthalimide are used as fungicides in agriculture and in horticulture; these compounds are of great importance amongst commercially available products (compare R. Wegler, "Chemie der Pflanzenschutz- and Schadlingsbekampfungsmittel" ("Chemistry of Plant Protection Agents and Pesticides"), volume 2, pages 65 and 108, Berlin/Heidelberg/New York (1970)). The action when using low concentrations is, however, not always satisfactory.

N-phenylcarbamic acid O-acetonoxime ester described in German Published Specification (DAS) 1,232,947 possesses only herbicidal activity.

It is furthermore known that organo-mercury compounds possess an excellent fungicidal and microbicidal activity (R. Wegler, loc. cit., volume 2, pages 137 to 147); however, the many toxicological misgivings about this category of compounds have led to their being forbidden in numerous countries. It is furthermore known that alkyl-dimethyl-benzyl-ammonium chlorides can be used for disinfecting circulating water and such compounds have acquired importance in practice.

The present invention provides substituted benzimidazol-2-yl-carbamic acid ketonoxime esters of the formula

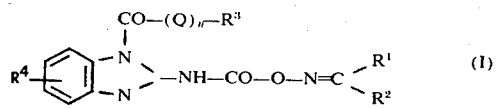

(I)

in which
R¹ and R² each independently is alkyl or alkenyl of up to 5 carbon atoms or phenyl, or R¹ and R² together are alkylene of 4 to 10 carbon atoms,
R³ is alkyl or alkenyl of up to 5 carbon atoms, phenyl, halophenyl, chloro-lower alkyl or cyano-lower alkyl,
R⁴ is hydrogen or lower alkyl,
Q is -O-, -NH- or

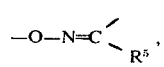

R⁵ is alkyl or alkenyl with up to 5 carbon atoms or phenyl, and
$n$ is 0 or 1.

The compound according to the invention is present in equilibrium with its tautomer of the formula

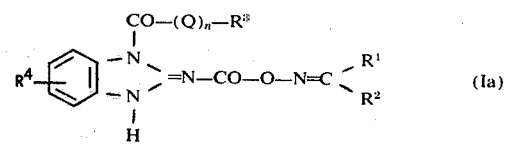

(Ia)

For reasons of simplicity, only the formula (I) will be given hereafter, but it is intended in each individual case also to embrace the corresponding tautomeric formula.

Preferably, R¹ is methyl and R² is methyl or ethyl, or R¹ and R² together are pentylene, R³ is alkyl of 1 to 4 carbon atoms, R⁴ is hydrogen and Q is —O— or —NH—.

Surprisingly, the substituted benzimidazol-2-yl-carbamic acid ketonoxime esters according to the invention show a fungicidal and bactericidal action which is superior to the previously known active compounds, and furthermore also possess a systemic-fungicidal action; they thus represent an enrichment of the art.

The invention also provides a process for the production of a substituted benzimidazol-2-yl-carbamic acid ketonoxime ester of the formula (I) in which a benzimidazol-2-yl-carbamic acid ketoxime ester of the formula

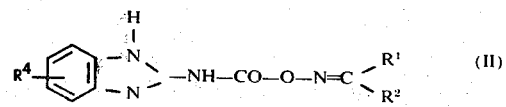

(II)

in which
R¹, R² and R⁴ have the abovementioned meanings, is reacted a. with a halocarbonyl compound of the formula $$X-CO-Q-R^3$$

(III)

in which
Q and R³ have the abovementioned meanings and X is halogen, or b. with an acid anhydride of the formula $$(R^3-CO)_2O$$

(IV)

in which
R³ has the abovementioned meaning, or c. with an isocyanate of the formula $$OCN-R^3$$

(V)

in which
R³ has the abovementioned meaning or d. with phosgene, to give a compound of the formula

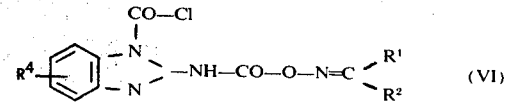

(VI)

in which
R¹, R² and R⁴ have the abovementioned meanings and the compound of the formula (VI) is reacted The reaction sequence according to process variant (d) can be represented by the following formula scheme:

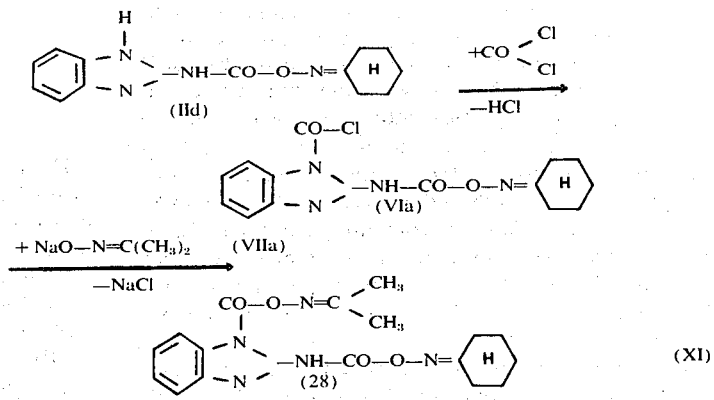

with a compound of the formula

H—Q—R³      (VII)

in which
Q and R³ have the abovementioned meanings,
or with a salt thereof.

If, according to process variant (a), benzimidazol-2-yl-carbamic acid acetonoxime ester and chloroformic acid methyl ester are used, the course of the reaction is represented by the following reaction scheme:

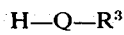

Examples of benzimidazol-2-yl-carbamic acid ketonoxime esters of the formula (II) which can be used as starting materials include 4- or 5-methyl, 4- or 5-ethyl-, 4- or 5-propyl-, 4- or 5-iso-propyl-, 4- or 5-sec.butyl-, 4- or 5-tert.-butyl-,4- or 5-isobutyl-, 4- or 5-butyl-benzimidazol-2-yl-carbamic acid acetonoxime ester, butanonoxime ester, pentan-3-onoxime ester, methyl-isobutylketonoxime ester, methyl-propen-1,2-yl-1-ketonoxime ester, acetophenonoxime ester, propiophenonoxime ester, butyrophenonoxime ester, benzophenonoxime ester, cyclopentanonoxime ester and cy-

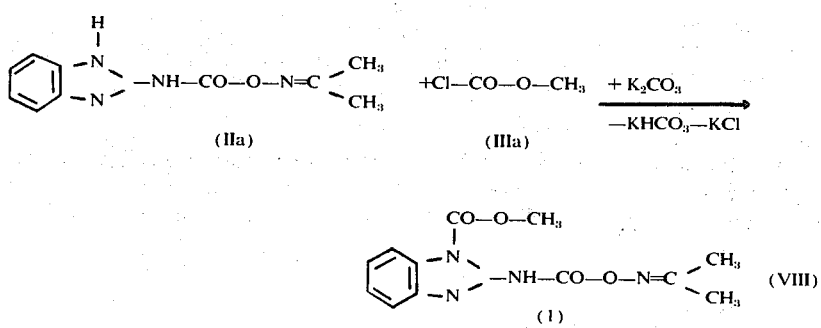

An example of a formula scheme for process variant (b) is:

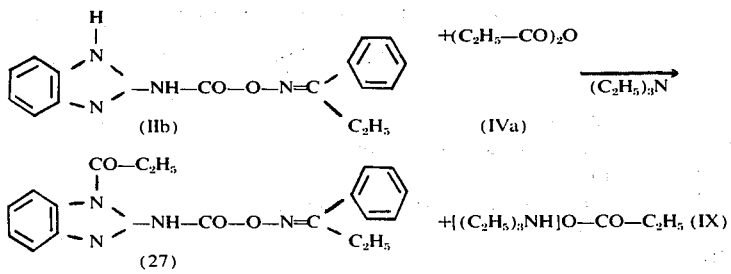

clohexanonoxime ester as well as the benzimidazol-2-yl-carbamic acid ketonoxime esters unsubstituted in the benzimidazole group. These benzimidazol-2-yl-carbamic acid ketonoxime esters are not yet known;

The course of the reaction according to process variant (c) is represented by the following formula scheme:

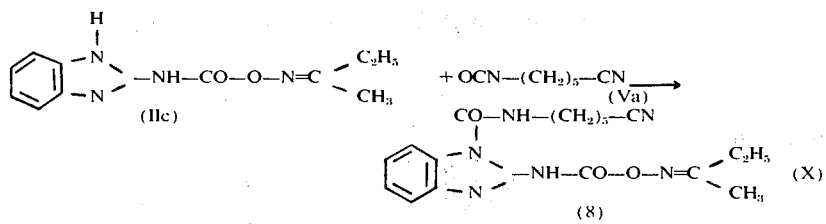

they can, however, be prepared by a process which is the subject of German Pat. Application No. P 22 27 921. Specifically, Tetrahedron Letters 45, 4313-6 6 discloses producing various ketonoximes, including acetonoxime, by reacting various ketones with hydroxylamine hydrochloride at room temperature in methanol or water containing sodium carbonate or sodium hydroxide with a ratio of hydroxylamine/ketone of 2:1, alkaline media favoring oxime function. As described in Z. Chemie. 7, 344–345 (1967) acetonoxime is dropped into cold phosgene dissolved in an inert solvent to produce acetonoxime chloroformate. This is recovered and reacted with an equimolar amount of acetonoxime, dissolved in an inert solvent at about 0°C, in the presence of a proton acceptor such as a tertiary amine or alkali carbonate to produce carbonic acid bis-acetonoxime-ester. According to Example 9a hereinbelow carbonic acid acetonoxime ester is reacted in an inert solvent at 40° to 150°C with 2-aminobenzimidazole, prepared according to U.S. Pat. No. 3,455,948, to produce benzimidazol-2-yl-carbamic acid acetonoxime ester. Other ketonoxime esters can be prepared by starting with other ketones, producing other oximes, the corresponding carbonic acid esters and the corresponding benzimidazol-2-yl-carbonic acid ketonoxime esters.

Examples of acylating agents to be reacted are: methyl, ethyl, isopropyl, butyl, chloroethyl, cyanoethyl, allyl, methallyl, crotyl, cyclopentyl and cyclohexyl chlorocarbonic acid esters; acetyl fluoride, propionyl bromide, isobutyric acid iodide, and chloroacetyl, dichloroacetyl, trichloroacetyl, cyanoacetyl, α- and β-chloro-isobutyroyl, acryloyl, methacryloyl, crotonoyl, benzoyl and hexahydrobenzoyl chloride or anhydride; furthermore there should be mentioned: acetonoxime, butanonoxime, pentanonoxime, methyl isopropyl ketonoxime, methyl isobutylketonoxime, mesityl oxide-oxime, phoronoxime, acetophenonoxime, propiophenonoxime, isobutyrophenonoxime, butyrophenonoxime, benzophenonoxime, cyclopentanonoxime and cyclohexanonoxime carbonic acid ester chloride. Many ketonoxime chlorocarbonic acid esters are known from the patent literature (compare Belgian Pat. No. 709,182 and German Offenlegungsschrift 1,809,385); those which are still new can be prepared analogously to the known substances. Furthermore, the following can be used for the reaction: methyl-, ethyl-, isopropyl-, butyl-, chloroethyl-, β-cyanoethyl-, ω-cyanopentyl-, phenyl- and cyclohexyl-isocyanate and -carbamic acid halide.

The reactions of the process according to the invention may be carried out in the presence of a solvent, such as acetone, methyl ethyl ketone, methylene chloride, chloroform, chlorobenzene, toluene, dioxane, tetrahydrofuran, acetonitrile, benzonitrile or ethyl acetate. In some cases, tertiary amines may be found suitable for use as the solvent.

The reactions can be carried out over a wide temperature range, for example −50° to +100°C.

The reactions can be carried out in a mixture of water and a water-miscible organic solvent, or in a heterogeneous system comprising water and a water-immiscible or only partially water-miscible solvent; in that case, the temperature is generally between the freezing point of water and +50°C, preferably −5° to +10°C.

Solvents such as dimethylformamide, dimethylacetamide or dimethylsulfoxide are also suitable for the reaction of isocyanates of the formula OCN-R[3] according to process variant (c); the isocyanate addition may be carried out in the presence of a catalyst, such as triethylenediamine, in which case the temperature range is preferably 20° to 60°C.

In the reaction of benzimidazol-2-yl-carbamic acid ketonoxime esters with acyl halides, acyl anhydrides or phosgene according to process variants (a), (b) or (d), hydrogen halides or carboxylic acids are produced. These may be bound by basic substances such as triethylamine, dimethylbenzylamine, dimethylaniline, diethylaniline, pyridine, picoline, quinoline, potassium carbonate, sodium carbonate, sodium bicarbonate, borax or trilithium phosphate. In the presence of water, the resulting acid can also be bound by adding alkali metal hydroxide solution, preferably in the presence of a buffer mixture, such as a phosphate buffer. The process variant (d) may be carried out in an anhydrous inert solvent or in a mixture of water and a water immiscible organic solvent. For this, for example, the 1-(chlorocarbonyl)-benzimidazol-2-yl-carbamic acid ketonoxime ester of the formula (VI) (obtained from benzimidazol-2-yl-carbamic acid ketonoxime ester at low temperature in the presence of phosgene and a base) may be reacted with double the molar amount of the amine of the formula (VII) or of a mixture of the amine of the formula (VII) and a tertiary amine, or with the amine of the formula (VII) in the presence of a buffer mixture of a pH-value of, preferably, 6–8, or a suspension of the alkali metal salts or alkaline earth metal salts of alcohols or ketonoximes may be reacted with the 1-(chlorocarbonyl)-benzimidazol-2-yl-carbamic acid ketonoxime esters in an anhydrous medium.

The active compounds according to the invention precipitate in some cases in a crystalline form while in some cases they remain dissolved in the organic solvent and can then be separated out by careful concentration of the solution or by adding a little polar solvent, such as carbon tetrachloride, cyclohexane or dibutyl ether, or by adding water.

Some of the compounds according to the invention decompose at higher temperatures; in these cases, the melting points can only be determined with a low accuracy or not at all. The presence of certain structural elements can be deduced from the NMR spectra. The IR spectra also show characteristic absorption bands. Thus the fact that the benzimidazol-2-yl-carbamic acid ketonoxime esters have reacted in the 1-position with halogenocarbonic acid esters is indicated by one or more intense carbonyl bands in the range of 1,700–1,800 cm$^{-1}$; the spectra of the chloroform solutions only show bands of medium to low intensity in the range from 1,600 to 1,700 cm$^{-1}$. The reaction products with carboxylic acid derivatives possess one or more strong bands at about 1,700–1,770 cm$^{-1}$ in the IR spectrum.

Addition products of isocyanates to benzimidazol-2-yl-carbamic acid ketonoxime esters show carbonyl bands in the range from 1,710 to 1,740 cm$^{-1}$ and further strong bands in the range of 1,580 to 1,670 cm$^{-1}$.

The active compounds according to the invention show a strong fungitoxic action and are distinguished by a broad spectrum of action. Fungitoxic agents are employed in plant protection for combating fungi from the most diverse classes of fungi, such as *Archimycetes, Phycomycetes, Ascomycetes, Basidiomycetes* and *Fungi Imperfecti*.

The active compounds according to the invention not only display the good properties of outstanding commercially available preparations but in addition also possess considerable advantages. These include the ability of the substances according to the invention to penetrate into the plant, to be conducted systemically and to develop their fungitoxic action away from the point of application. They can be taken up by the surface of the seed, by the roots and also by above-ground plant organs after external application. They also possess the advantageous ability of acting locosystemically, that is to say of exerting a depth action in the plant tissue and thereby eleminating fungal pathogens which have already penetrated into the tissue of the host plant. Furthermore, the compounds according to the invention show a considerably better activity against various fungal pathogens of plant diseases, such as against apple scab, against *Piricularia* and *Pellicularia*, against bunt of wheat and against several phytopathogenic soil fungi, than do known commercially available preparations.

As plant protection agents, the compounds according to the invention can be used for the treatment of soil, for the treatment of seed and for the treatment of above-ground parts of plants. They are active, for example, against *Erysiphe graminis, Ustilago unda, Ustilago avenae, Piricularia oryzae, Colletotrichum coffeanum, Tilletia caries, Sclerotinia sclerotiorum, Verticillium alboatrum, Thielaviopsis basicola, Fusarium nivale, Phialophora cinerescens* and *Cercospora musae*.

The compounds according to the invention are well tolerated by plants. They only have a low toxicity towards warm-blooded animals and, because of their slight odor and good toleration by human skin, they are not unpleasant to handle.

The active compounds according to the invention are furthermore of interest as microbiocides. Because of their superior anti-microbial action, which extends to a broad range of micro-organisms, the compounds are suitable for numerous purposes in disinfection, preservation and the provision of an anti-microbial finish; furthermore, they possess a good action against blue algae and green algae. The compounds can in particular be used for preserving wood pulp.

As micro-organisms whereof the combating is of economic importance there should be mentioned *Aspergillus niger, Penicillium camerunense* and *Paecilomyces varioti* as representatives of resistant molds and *Trichophyton mentagrophytes* as a wide-spread foot rot fungus. *Candida albicans* and *Saccharomyces* spec. belong to the yeasts, which frequently occur in pathogenic forms. *Escherichia coli, Bacterium proteus, Pseudomonas pyocyanea* and *Staphylococcus aureus* belong to the Gram-negative or Gram-positive bacteria and some are pathogenic.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.) cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, microbicides and algicides, or insecticides, acaricides, rodenticides, bactericides, nematocides, herbicides, fertilizers, growth-regulating agents, bird repellents, agents for improving soil structure, etc., if desired, or in the form of particular dosage preparations for specific application made therefrom, such as solutions, emulsions, suspensions, powders, pastes, and granules which are thus ready for use.

Additionally to the above possible formulations it should be noted that the products according to the invention can be formulated together with sucrose, dextrose and dextrins and that the formulations should, if possible, have a pH-value of 3–7, preferably of 4–5.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%., preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

When the compounds are used as leaf fungicides, the concentrations of active compound in the application forms can be varied over a wide range. They are generally 0.5 to 0.0005 per cent by weight, preferably 0.2 to 0.001.

In the treatment of seed, amounts of active compound of 0.01 – 50 g per kilogram of seed, preferably 0.05 – 0.5 g, are generally required.

For the treatment of soil, amounts of active compound of 1–1,000 g per cubic meter of soil, preferably of 10–200g, are generally required.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, bacteria and yeasts, and more particularly methods of combating at least one of insects and acarids, which comprises applying to at least one of correspondingly (a) such insects, (b) such acarids, (c) such fungi, (d) such bacteria, (e) such yeasts, and (f) the corresponding habitat thereof, i.e. the locus to be protected, a correspondingly combative or toxic amount, i.e. an insecticidally, acaricidally, fungicidally, bactericidally or yeasticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dry dressing, moist dressing, slurry dressing, wet dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Seed dressing test/bunt of wheat (seed-born mycosis)

To produce a suitable dry dressing, the active compound was extended with a mixture of equal parts by weight of talc and kieselguhr to give a finely powdered mixture with the desired concentration of the active compound.

Wheat seed was contaminated with 5 g of the chlamydospores of *Tilletia caries* per kg of seed. To apply the dressing, the seed was shaken with the dressing in a closed glass flask. The seed, on moist loam under a cover of a layer of muslin and 2 cm of moderately moist compost soil, was exposed to optimum germination conditions for the spores for 10 days at 10°C in a refrigerator.

The germination of the spores on the wheat grains, each of which was contaminated with about 100,000 spores, was subsequently determined microscopically. The smaller the number of spores which had germinated, the more effective was the active compound.

The active compounds, the concentrations of the active compounds in the dressing, the amounts of dressing used and the percentage spore germination can be seen from Table 1.

Table 1

| Active compounds | Seed dressing test/bunt of wheat Active compound concentration in the dressing in % by weight | Amount of dressing used in g/kg of seed | Spore germination in % |
| --- | --- | --- | --- |
| without dressing | — | — | >10 |
| CH$_2$—NH—C(=S)—S \ Zn / CH$_2$—NH—C(=S)—S (known) (A) | 10 | 1 | 5 |
| [phenyl]—N=C(—CO—O—CH$_3$)—N=... —C—NH—CO—O—N=C(CH$_3$)(CH$_3$) (1) | 3 10 | 1 1 | 0.000 0.000 |

Table 1—Continued

| Active compounds | | Seed dressing test/bunt of wheat Active compound concentration in the dressing in % by weight | Amount of dressing used in g/kg of seed | Spore germination in % |
|---|---|---|---|---|
| [structure with CO—O—CH$_3$, C—NH—CO—O—N=⟨H⟩] | (5) | 5<br>10 | 1<br>1 | 0.000<br>0.000 |
| [structure with CO—NH—CH$_3$, C—NH—CO—O—N=⟨H⟩] | (11) | 1<br>2.5<br>5<br>10 | 1<br>1<br>1<br>1 | 0.000<br>0.000<br>0.000<br>0.000 |
| [structure with CO—O—CH(CH$_3$)$_2$, C—NH—CO—O—N=⟨H⟩] | (15) | 10 | 1 | 0.05 |
| [structure with CO—O—CH$_3$, C—NH—CO—O—N=C(C$_2$H$_5$)(CH$_3$)] | (3) | 5<br>10 | 1<br>1 | 0.005<br>0.000 |
| [structure with CO—NH—⟨phenyl⟩, C—NH—CO—O—N=⟨H⟩] | (20) | 10 | 1 | 0.000 |
| [structure with CO—NH—⟨dichlorophenyl⟩, C—NH—CO—O—N=⟨H⟩] | (22) | 10 | 1 | 0.000 |

EXAMPLE 2

Seed dressing test/loose smut of oats (seed-born mycosis)

To produce a suitable dry dressing, the active compound was extended with a mixture of equal parts by weight of talc and kieselguhr to give a finely powdered mixture with the desired concentration of active compound.

To apply the dressing, oat seed, which was naturally infested with loose smut (*Ustilago avenae*), was shaken with the dressing in a closed glass flask. Two batches of 100 grains of the seed were sown 2 cm deep in seed boxes containing a mixture of 1 part by volume of Fruhstorfer standard soil and 1 part by volume of quartz sand. The boxes were placed in a greenhouse at a temperature of about 18°C, kept normally moist and exposed to light for 16 hours daily. After 10–12 weeks, the oats flowered and showed healthy and diseased panicles (smutted panicles).

After this time, the number of diseased panicles was determined as a percentage of the total number of developed panicles. 0% means that no diseased panicles were present; 100% means that all the panicles were diseased. The fewer diseased panicles were formed, the more effective was the active compound.

The active compounds, the concentrations of the active compounds in the dressing, the amounts of dressing used and the number of diseased panicles can be seen from Table 2.

Table 2

| Active compounds | | Seed dresing test/loose smut of oats Active compound concentration in the dressing in % by weight | Amount of dressing used in g/kg of seed | –Number of diseased panicles in % of the total number of developed panicles |
|---|---|---|---|---|
| without dressing | | — | — | 56.3 |
| [CH$_2$—NH—C(=S)—S]$_2$Zn (Known) | (A) | 30 | 3 | 36.8 |
| [structure with CO—O—CH$_3$, C—NH—CO—O—N=C(CH$_3$)(CH$_3$)] | (1) | 30 | 3 | 3.6 |

EXAMPLE 3

Seed dressing test/loose smut of barley (seed-born mycosis)

To produce a suitable dry dressing, the active compound was extended with a mixture of equal parts by weight of talc and kieselguhr to give a finely powdered mixture with the desired concentration of active compound.

To apply the dressing, barley seed, which was naturally infested with loose smut of barley (*Ustilago nuda*) was shaken with the dressing in a closed glass flask. Two batches of 100 grains of the seed were sown 2 cm deep in seed boxes containing a mixture of 1 part by volume of Fruhstorfer standard soil and 1 part by volume of quartz sand. The boxes were placed in a greenhouse at a temperature of about 18°C, kept normally moist and exposed to light for 16 hours daily. After 8–10 weeks, the barley flowered and showed healthy and diseased ears (smutted ears).

After this time, the number of diseased ears was determined as a percentage of the total number of developed ears. 0% means that no diseased ears were present; 100% means that all the ears were diseased. The fewer diseased ears were formed, the more effective was the active compound.

The active compounds, the concentrations of the active compounds in the dressing, the amounts of dressing used and the number of diseased ears can be seen from Table 3.

Table 3

Seed dressing test/loose smut of barley

| Active compounds | Amounts of active compound used in mg/kg of seed | Number of diseased panicles in % of the total number of developed panicles. |
| --- | --- | --- |
| without dressing | — | 21.6 |
| 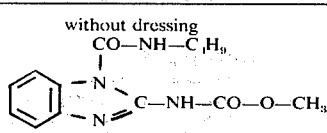 (known from U.S. Patent Specification 3,541,213) (B) | 1,000<br>2,500 | 9.9<br>8.5 |
| 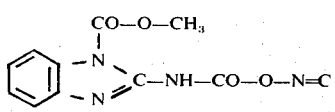 (1) | 600<br>3,000 | 1.2<br>0.0 |

EXAMPLE 4

Seed dressing test/snow mould (seed-born mycosis)

To produce a suitable dry dressing, the active compound was extended with a mixture of equal parts by weight of talc and kieselguhr to give a finely powdered mixture with the desired concentration of active compound.

To apply the dressing, rye seed, which was naturally infected by *Fusarium nivale*, was shaken with the dressing in a closed glass flask. Two batches of 100 grains of this seed were sown 1 cm deep in seed boxes containing Fruhstorfer standard soil. The young plants developed in climatic chambers at 10°C, at a relative atmospheric humidity of 95% and in diffused natural light; they showed the typical symptoms of snow mould within the first 3 weeks.

After this time, the number of Fusarium-infected plants was determined as a percentage of the total number of emerged plants. The smaller the number of diseased plants, the more effective was the active compound.

The active compounds, the concentrations of the active compounds in the dressing, the amounts of dressing used and the number of diseased plants can be seen from Table 4.

Table 4

Seed dressing test/snow mold

| Active compound | Active compound concentration in the dressing in % by weight | Amount of dressing used in g/kg of seed | Number of *Fusarium*-infected plants in % of the total number of emerged plants |
| --- | --- | --- | --- |
| without dressing | — | — | 13.6 |
| 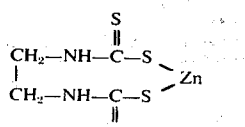 (known) (A) | 10<br>30<br>75 | 2<br>2<br>2 | 8.3<br>9.1<br>7.3 |
| 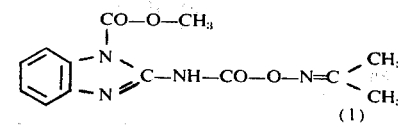 (1) | 0.1<br>0.3<br>1<br>3 | 2<br>2<br>2<br>2 | 0.5<br>0.0<br>0.5<br>0.0 |

EXAMPLE 5:

Barley mildew test (*Erysiphe graminis* var. *hordei*) / systemic (fungal cereal shoot disease)

The active compounds were used as pulverulent seed dressings. They were prepared by extending the particular active compound with a mixture of equal parts by weight of talc and kieselguhr to give a finely powdered mixture of the desired concentration of active compound.

To treat the seed, barley seed was shaken with the extended active compound in a closed glass flask. The seed was sown at the rate of 3 × 12 grains in flower pots, 2 cm deep in a mixture of one part by volume of Fruhstorfer standard soil and one part by volume of quartz sand. The germination and emergence took place under favorable conditions in a greenhouse. 7 days after sowing, when the barley plants had developed their first leaf, they were dusted with fresh spores of *Erysiphe graminis* var. *hordei* and further cultured at 21°–22°C and 70% relative atmospheric humidity and 16 hours' exposure to light. Within 6 days, the typical mildew pustules formed on the leaves.

The degree of infection is expressed in percentages of the infection of the untreated control plants. Thus, 0% denotes no infection and 100% denotes the same degree of infection as in the case of the untreated control. The active compound was the more active, the less was the mildew infection.

The active compounds, the concentrations of the active compounds in the seed dressing and the amount used of the latter, and the percentage mildew infection can be seen from Table 5.

EXAMPLE 6

Microbicidal action / preservation of wood pulp

Wood pulp of the water content indicated in the table was treated with antimicrobial agents in various concentrations. Samples of the wood pulp of size 2 × 2 cm were placed on nutrient bases inoculated with fungi and incubated, and thereafter the radii of the inhibition zones was measured. Furthermore, samples of size 10 × 10 cm were buried in soil and the degree of rotting was observed after 3, 6 and 10 weeks.

Table 6 shows the active compounds, the concentrations of active compound in the samples of wood pulp and the results.

The concentrations shown in the table relate to the dry weights.

The numerical values given under the column heading "Degree of rotting" have the following meanings:
0 = no visible rotting
1 = moderate attack by mold
2 = severe attack by mold
3 = completely rotted Table 5

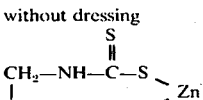

Table 6

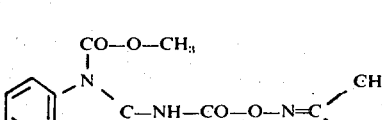

EXAMPLE 7:

Algicidal action / disinfection of circulating water.

25 ml per cubic meter of water were added 3 times daily to the severely algae-contaminated circulating water of a cooling tower.

The number of germs per ml of water at various times can be seen from Table 7.

Table 7

| Algicidal action/disinfection of circulating water | | Number of germs/cc |
|---|---|---|
| Alkyl-dimethyl-benzyl-ammonium chloride (D) (known commercially available product) | before addition 15' after addition | 500,000 2,000 |
| [Compound (1): phenyl-triazine with CO—O—CH$_3$, NH—CO—O—N=C(CH$_3$)$_2$] | 15' after addition 30'  "       " 60'  "       " 120' "       " | 50 100 200 200 |

EXAMPLE 8

Shoot treatment test / cereal mildew (leaf-destructive mycosis)

To prepare an appropriate preparation of active compound, 0.25 part by weight of active compound was taken up in 25 parts by weight of dimethylformamide and 0.06 part by weight of Emulsifier W and 975 parats by weight of water were added. The concentrate was diluted with water to the desired concentration of the spray liquor.

To test for the protective activity, single-leaved young barley plants of the Amsel variety were sprayed with the preparation of active compound until dew-moist. After the spray had dried on, the barley plants were dusted with spores of *Erysiphe graminis* var. *hordei*.

After 6 days dwell time of the plants at a temperature of 21°–22°C and an atmospheric humidity of 80-90%, the infection of the plants with mildew pustules was assessed. The degree of infection is expressed as a percentage of the infection of the untreated control plants. 0% denotes no infection and 100% denotes the same degree of infection as in the case of the untreated control. The active compound was the more active, the less was the rust infection.

The active compounds, the concentrations of active compound in the spray liquor and the degrees of infection can be seen from Table 8.

Table 8

| Shoot treatment test/cereal mildew/protective Active compounds | Active compound concentration in the spray liquor in % | Infection in % of the untreated control |
|---|---|---|
| untreated | — | 100.0 |
| [Zn dithiocarbamate compound] (known) (A) | 0.3 0.1 | 64.0 80.5 |
| [Compound (5): phenyl-triazine CO—O—CH$_3$, C—NH—CO—O—N=cyclohexyl] | 0.025 0.01 | 3.8 25.0 |
| [Compound (11): phenyl-triazine CO—NH—CH$_3$, C—NH—CO—O—N=cyclohexyl] | 0.025 | 25.0 |
| [Compound (17): phenyl-triazine CO—O—CH$_3$, C—NH—CO—O—N=C(CH$_3$)(C$_4$H$_9$-iso)] | 0.025 0.01 | 23.8 25.0 |
| [Compound (21): phenyl-triazine CO—NH—C$_4$H$_9$, C—NH—CO—O—N=cyclohexyl] | 0.025 0.01 | 0.0 0.0 |

The following examples illustrate the synthesis of the compounds.

EXAMPLE 9:

a. Preparation of the starting compound benzimidazol-2-yl-carbamic acid acetoxime ester:

404 g (3.04 moles) of 2-aminobenzimidazole, 542 g (3.15 moles) of carbonic acid acetonoxime ester, 1.5 l of toluene and 0.5 ml of pyridine were kept at a temperature of 60° to 70°C for 7 hours, while stirring. A visible reaction already occurred after 17 minutes. The benzimidazol-2-yl-carbamic acid acetoxime ester was filtered off and washed with toluene and with water.

The yield was 685 g (representing 97% of theory).

The melting point was above 325°C.

IR (KBr): bands at 1,035, 1,065, 1,585 – 1,600, 1,625, 1,670 cm$^{-1}$, CO 1,735 cm$^{-1}$ (w).

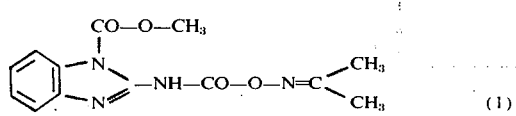  (1)

997 g (4.28 moles) of benzimidazol-2-yl-carbamic acid acetoxime ester, 5 l of methylene chloride and 2 kg of ice were mixed initially, and cooled externally with ice. 60 g of tertiary sodium phosphate (Na$_3$PO$_4$ 12H$_2$O) and 812 g of chloroformic acid methyl ester were added while stirring. The pH was kept in the range of 6.0–8.0 by dropwise addition of approximately 20% strength sodium hydroxide solution at a temperature below 4°C. When the pH-value remained constant at approximately 7, after about 3 hours, the reaction was complete. The mixture was adjusted to a pH-value of 4–5 by means of phosphoric acid. The solvent was stripped off in vacuo. The resulting crystals were separated off, washed with water until free of salt, subsequently suspended in xylene, then washed with xylene and finally dried in a high vacuum at 55°C. 1,054 g of 1-methoxycarbonyl-benzimidazol-2-yl-carbamic acid acetoxime ester were obtained; after recrystallization from a little methylene chloride the melting point was 136°–144°C (with decomposition). IR (CHCl$_3$): 3 bands CO 1,735, 1,745 and 1,765 cm$^{-1}$; IR (KBr): NH 3,300 cm$^{-1}$.

EXAMPLE 10:

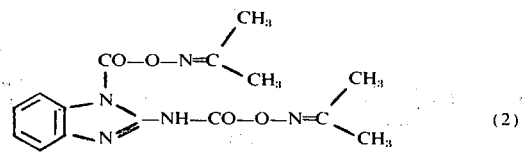  (2)

46.5 g of benzimidazol-2-yl-carbamic acid acetoxime ester, 200 ml of water and 170 ml of alcohol-free chloroform were first mixed, at a temperature below 4°C. 0.24 mole of a 21.5% strength solution of acetoxime chlorocarbonic acid ester in methylene chloride was then added and thereafter a 1 N potassium carbonate solution was added dropwise in such a way that the pH-value was kept between 6 and 7.5. After 1 hour, the reaction was complete. The reaction mixture was adjusted to pH 4.5 with phosphoric acid and diluted with 100 ml of chloroform. The organic phase was separated off, washed once with water, dried over sodium sulfate and, after addition of 300 ml of dibutyl ether, freed of chloroform and methylene chloride in vacuo. The reaction product crystallized out. It was separated off and washed with dibutyl ether. The yield was 54.5 g. Melting point 131°–133°C (with decomposition).

IR (KBr): NH 3,210 cm$^{-1}$, CO 1,767 cm$^{-1}$.

EXAMPLE 11:

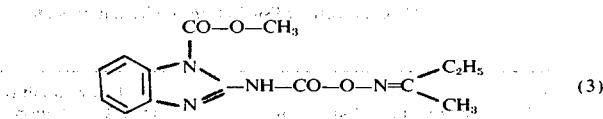  (3)

The compound was prepared analogously to Example 9.

Melting point 139°– 142°C.

The starting product, benzimidazol-2-yl-carbamic acid butanonoxime ester, was prepared analogously to benzimidazol-2-yl-carbamic acid acetoxime ester.

IR (KBr): NH 3,300-3,320 cm$^{-1}$; CO 1,745 cm$^{-1}$.

The melting point was above 300°C.

EXAMPLE 12:

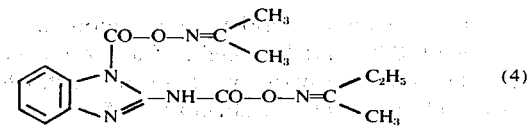  (4)

The compound was prepared analogously to Example 10.

Melting point 123.5° – 125°C (with decomposition).

IR (KBr): NH 3,200 cm$^{-1}$; CO 1,763 and 1,775 cm$^{-1}$.

EXAMPLE 13:

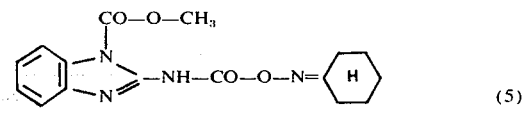  (5)

The compound was prepared analogously to Example 9.

Melting point (from dibutyl ether) 129.5° – 135.5°C.

The starting product, benzimidazol-2-yl-carbamic acid cyclohexanonoxime ester was prepared analogously to benzimidazol-2-yl-carbamic acid acetoxime ester:

Melting point approximately 242°C (decomposition); IR (KBr); NH 3,330-3,350 cm$^{-1}$; CO 1,735 cm$^{-1}$.

EXAMPLE 14:

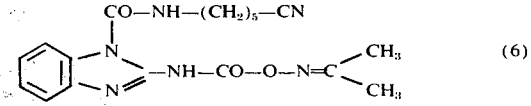  (6)

93 g of benzimidazol-2-yl-carbamic acid acetoxime ester, 180 ml of dimethylformamide, 2.5 g of picoline and 61.5 g of cyanopentyl isocyanate were stirred for 8 hours at a temperature of 35°C. The crystals were separated off after cooling to 10°C, and were washed first with cold dimethylformamide and then with water.

The yield was 111.5 g (after drying in vacuo).
Melting point approximately 151°C.
IR (KBr): NH 3,250 cm⁻¹; CN 2,240 cm⁻¹; CO (of the added isocyanate) 1,737 cm⁻¹; CH₂ 1,470 cm⁻¹.

A second crystal fraction was obtained from the mother liquor by precipitation with ice.

EXAMPLE 15:

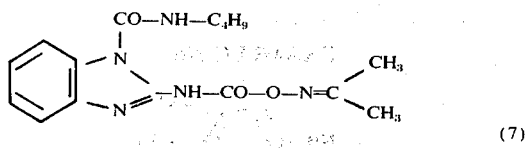

(7)

The compound was prepared analogously to Example 14.
IR (KBr): NH 3,280 cm⁻¹; CO (of the added isocyanate) 1,736 cm⁻¹, CH₂ 1,470 cm⁻¹.

EXAMPLE 16:

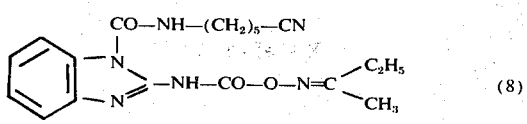

(8)

The compound was prepared analogously to Example 14.
IR (KBr): NH 3,250 cm⁻¹; CN 2,240 cm⁻¹; CO (of the added isocyanate) 1,736 cm⁻¹; CH₂ 1,472 cm⁻¹.

EXAMPLE 17:

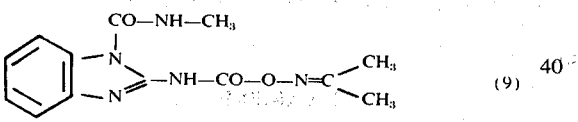

(9)

The compound was prepared analogously to Example 14.
Melting point 221°C. IR (KBr): NH 3,280 cm⁻¹; CO 1,717 cm⁻¹.

EXAMPLE 18:

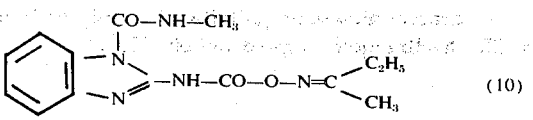

(10)

The compound was prepared analogously to Example 14.
Melting point approximately 198°C. IR (KBr): NH 3,275 cm⁻¹; CO 1,725 sh 1,718 cm⁻¹.

EXAMPLE 19:

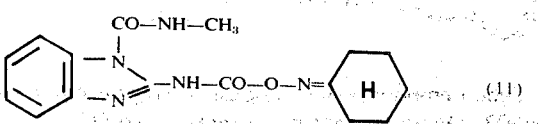

(11)

The compound was prepared analogously to Example 14.
Melting point approximately 207°C. IR (KBr): NH 3,250 sh 3,280 cm⁻¹; CO 1,712 sh 1,720 cm⁻¹.

EXAMPLE 20:

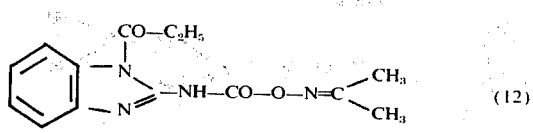

(12)

23.2 g of benzimidazol-2-yl-carbamic acid acetoxime ester, 100 ml of acetonitrile and 20 g of pyridine were initially taken at 15°C. A mixture of 10 g of propionic acid chloride and 20 ml of acetonitrile was then added dropwise over the course of 20 minutes. The mixture was stirred for a further 4 hours. The crystals were separated off and washed with acetonitrile and water and were thereafter dried in vacuo.

Melting point of the reaction product approximately 170°C.
IR(KBr): CO 1,740 and 1,760 cm⁻¹.

EXAMPLE 21:

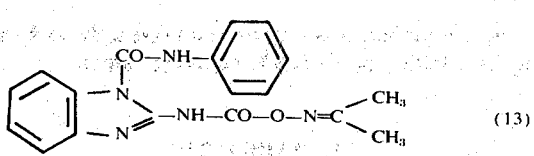

(13)

The compound was prepared analogously to Example 14.
Decomposition at 243°C. IR (KBr): NH 3,265 cm⁻¹; CO 1,715 cm⁻¹; 5 H ar 750 cm⁻¹.

EXAMPLE 22:

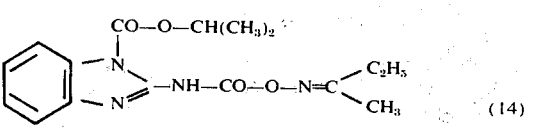

(14)

The compound was prepared analogously to Example 9.
Melting point approximately 134°C.

EXAMPLE 23:

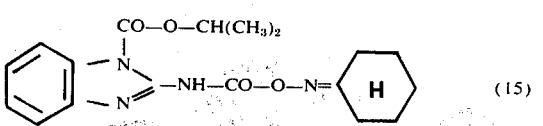

(15)

The compound was prepared analogously to Example 9.
Melting point 123° – 126°C (from acetone/water).

EXAMPLE 24:

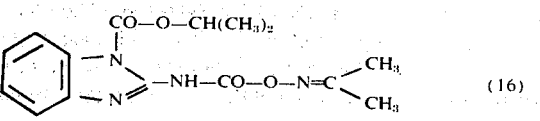

(16)

The compound was prepared in accordance with Example 9.

Melting point 131.5° – 135°C (from acetone/water).

EXAMPLE 25:

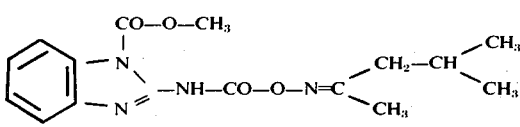  (17)

The compound was prepared analogously to Example 9. Melting point 134°C (decomposition).

EXAMPLE 26:

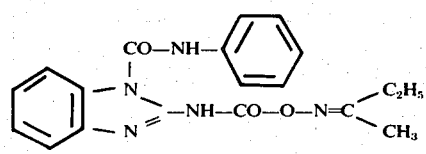  (18)

The compound was prepared analogously to Example 14. Melting point 168°C (decomposition).

EXAMPLE 27:

A mixture of:

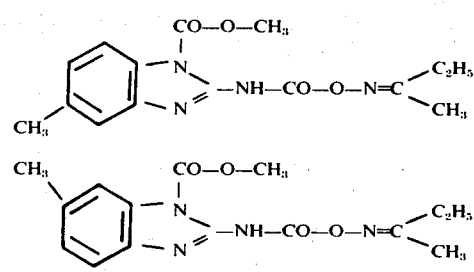  (19a) and (19b)

The mixture was prepared analogously to Example 9. Melting point 98°–103°C (decomposition).

EXAMPLE 28:

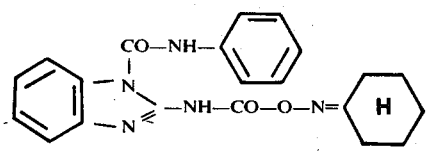  (20)

A suspension of 20.5 g of benzimidazol-2-yl-carbamic acid cyclohexanonoxime ester in 200 ml of acetonitrile was mixed with 9 g of phenyl isocyanate and the mixture was stirred for 4 hours. The reaction product was separated off, washed with acetonitrile and dried in vacuo at 60°C. 21 g of the new compound, of melting point approximately 206°C, were obtained.

EXAMPLE 29:

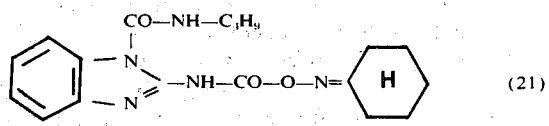  (21)

The compound was prepared analogously to Example 28. Melting point approximately 195°C.

EXAMPLE 30:

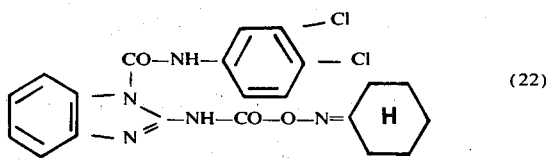  (22)

The compound was prepared analogously to Example 28. Melting point approximately 199°C.

EXAMPLE 31:

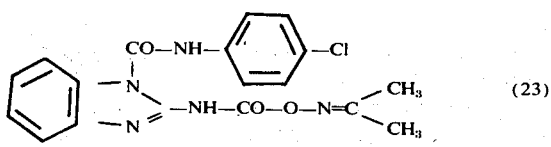  (23)

The compound was prepared analogously to Example 28. Melting point approximately 212°C.

EXAMPLE 32:

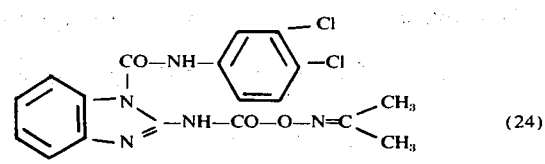  (24)

The compound was prepared analogously to Example 28. Melting point approximately 223°C.

EXAMPLE 33:

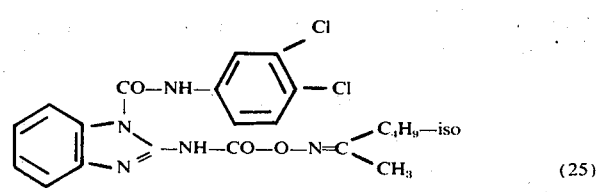  (25)

The compound was prepared analogously to Example 28. Melting point approximately 186°C.

EXAMPLE 34:

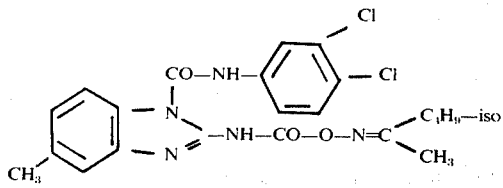

(26)

The compound was prepared analogously to Example 28. Melting point approximately 176°C.

Other compounds which may be similarly prepared include:

1-(carboxylic acid ester of acetophenonoxime)-benzimidazol-2-yl-carbamic acid acetophenonoxime ester,
1-(4-bromo-benzoyl)-4-butyl-benzimidazol-2-yl-carbamic acid cyclopentanonoxime ester,
1-(4-chlorobutyl)-benzimidazol-2-yl-carbamic acid acetonoxime ester,
1-(1,6-heptadien-4-imino-oxy-carbonyl)-benzimidazol-2-yl-carbamic acid, 1,6-heptadienon-4-oxime ester, and the like.

It will be appreciated that the instant specification and examples are set forth by way of illustration and not limitation, and that various modifications and changes may be made without departing from the spirit and scope of the present invention.

What is claimed is:

1. A substituted benzimidazol-2yl-carbamic acid ketonoxime ester of the formula

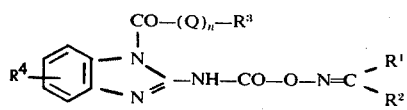

in which
R$^1$ and R$^2$ each independently is alkyl of up to 5 carbon atoms, or phenyl, or R$^1$ and R$^2$ together are alkylene of 4 to 10 carbon atoms,
R$^3$ is alkyl of up to 5 carbon atoms, phenyl, mono-halophenyl, di-halophenyl mono-chloro-lower alkyl or mono-cyano-lower alkyl,
R$^4$ is hydrogen or lower alkyl,
Q is —O—, —NH— or

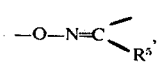

R$^5$ is alkyl with up to 5 carbon atoms or phenyl, and n is 0 or 1.

2. A compound according to claim 1 in which R$^1$ is methyl and R$^2$ is methyl or ethyl, or R$^1$ or R$^2$ together are pentylene, R$^3$ is alkyl of 1 to 4 carbon atoms, R$^4$ is hydrogen and Q is —O— or —NH—.

3. The compound according to claim 1 wherein such compound is 1-carbomethoxy-benzimidazol-2-yl-carbamic acid cyclohexanonoxime ester of the formula

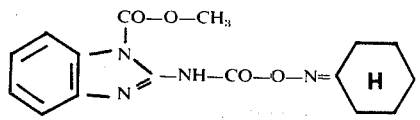
(5)

4. The compound according to claim 1 wherein such compound is 1-carbisopropoxy-benzimidazol-2-yl-carbamic acid cyclohexanonoxime ester of the formula

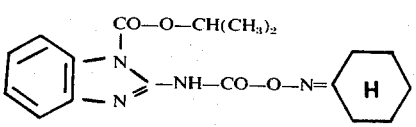
(15)

5. The compound according to claim 1 wherein such compound is 1-carbomethoxy-5-methyl-benzimidazol-2-yl-carbamic acid butanonoxime ester of the formula

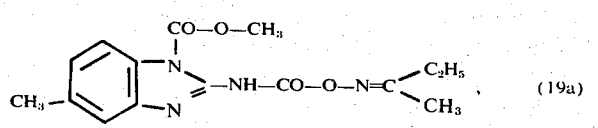
(19a)

1-carbomethoxy-6-methyl-benzimidazol-2-yl-carbamic acid butanonoxime ester of the formula

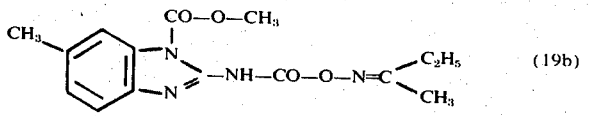
(19b)

or mixtures thereof.

6. The compound according to claim 1 wherein such compound is 1-anilinocarbonyl-benzimidazol-2-yl-carbamic acid cyclohexanonoxime ester of the formula

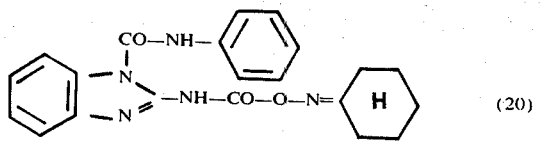
(20)

7. The compound according to claim 1 wherein such compound is 1-butylaminocarbonyl-benzimidazol-2-yl-carbamic acid cyclohexanonoxime ester of the formula

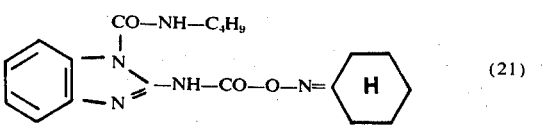
(21)

8. The compound according to claim 1 wherein such compound is 1-(3,4-dichloroanilinocarbonyl)-benzimidazol-2-yl-carbamic acid cyclohexanonoxime ester of the formula

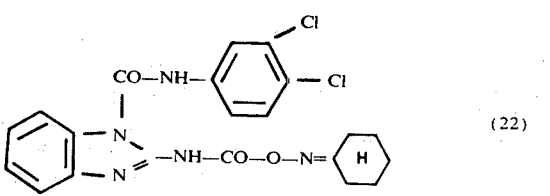
(22)

* * * * *